(12) United States Patent
Chapon et al.

(10) Patent No.: US 7,900,427 B2
(45) Date of Patent: Mar. 8, 2011

(54) LOADING DEVICE

(75) Inventors: Emmanuel Chapon, Champvans (FR); Jean Viaud, Gray (FR); Benoit Camus, Bourguignon-les-Conflans (FR)

(73) Assignee: Deere & Company, Moline, IL (US)

( * ) Notice: Subject to any disclaimer, the term of this patent is extended or adjusted under 35 U.S.C. 154(b) by 941 days.

(21) Appl. No.: 11/395,823

(22) Filed: Mar. 31, 2006

(65) Prior Publication Data
US 2006/0218878 A1 Oct. 5, 2006

(30) Foreign Application Priority Data
Apr. 2, 2005 (DE) .......................... 10 2005 015 225

(51) Int. Cl.
*B65B 11/56* (2006.01)
*B65B 11/04* (2006.01)

(52) U.S. Cl. ............................................ 53/587; 53/211

(58) Field of Classification Search ................. 53/587, 53/588, 211, 218, 219, 390, 393
See application file for complete search history.

(56) References Cited

FOREIGN PATENT DOCUMENTS

| DE | 197 11 164 | 3/1997 |
|---|---|---|
| DE | 102 11 412 | 3/2002 |
| DE | 10 2004 027307 | 6/2004 |
| EP | 0 252 485 A1 | 1/1988 |
| EP | 0 253 252 A1 | 1/1988 |
| EP | 1 099 366 | 11/2000 |
| EP | 1 527 674 A1 | 5/2005 |

OTHER PUBLICATIONS

German Search Report, Sep. 18, 2008, 4 Pages.

*Primary Examiner* — Rinaldi I. Rada
*Assistant Examiner* — John Paradiso (57) ABSTRACT

A loading device for the wrapping material roll of a wrapping mechanism is provided. The wrapping material roll can be placed on a carrier of the loading device and moved into an operating condition, where it is held in position by means of a roller. The roller is brought into operating position by an activating device, as soon as the carrier is moved out of its loading position.

10 Claims, 6 Drawing Sheets

LOADING DEVICE

BACKGROUND

1. Field of the Invention

The invention pertains to a loading device of a wrapping mechanism, particularly a round baler, using a wrapping material roll.

2. Prior Technology

Several devices are known in the state-of-the-art with which a wrapping material roll can be mounted in the wrapping mechanism of a machine, e.g. a round baler. The document EP 1 099 366 A1 shows a loading device in which a wrapping material roll can be placed on a carrier and brought, with the help of the carrier, into an operating position. One problem with the known technology is that after inserting the wrapping material roll, further manual operations are required before the loading device and wrapping mechanism are ready for operation.

BRIEF SUMMARY OF THE INVENTION

The above and other draw backs of the known technology are overcome by the present invention in which a wrapping mechanism includes a loading device that has a carrier for taking up the wrapping material roll. The loading device is movable between a loading position and an operating position where the wrapping material can be taken off of the wrapping material roll. An activating device is coupled to the loading device and is triggered to move the loading device into the operating position depending on the position of the carrier. In one embodiment, the loading device and wrapping mechanism can be made ready for operation by manually moving the carrier. This advantage simplifies the operation and ensures that the loading device is ready for operation whenever the carrier is raised, thus saving time. The position of the carrier can be transmitted to the activating device, either mechanically, electrically or hydraulically, e.g. by switches, mechanical linkages, etc.

While the carrier may be positioned such that it is readily accessible for manual operation, i.e. can be manually swung between its positions, for heavy carriers or those with bad accessibility, it is advantageous if their movement is carried out with the help of a motor.

In order to move the wrapping mechanism into an operating position, ideally rollers are provided to secure the position of the wrapping material roll and that can be moved towards the wrapping material roll with the help of one or more linkage rods. The rollers can thus be designed in a braking or driving or freely rotating manner, and the linkage rods could simply be in the form of one or more steering rods, which swivel around fixed bearings. Alternatively, electrically or hydraulically movable rollers could also be provided.

When external forces act on the carrier, e.g. a spring-type activating device, it is advantageous if the carrier is secured in at least one end position for the safety of the operator. A locking mechanism provided for this purpose can either be designed mechanically and/or be pre-stressed in one or both directions, or be movable with the help of an outside force. In order for the locking mechanism, if provided, to be moved by an operator along with the carrier, a lock activating device is provided and is situated at a position where the operator can also have access to the carrier.

One possibility of bringing the loading device to its operating position is that the mechanisms activating the device, depending on the position of the carrier, contain mechanical stops that are connected on one side to the carrier and on the other side to the activating device. These mechanical stops preferably move concentrically around a common bearing, around which the carrier and an arm connected to the activating device can be swiveled.

BRIEF DESCRIPTION OF THE DRAWINGS

One embodiment of a wrapping mechanism according to the principles of the invention, which is further described below, is shown in the drawings, which include the following.

DETAILED DESCRIPTION OF THE INVENTION

Figure 1:
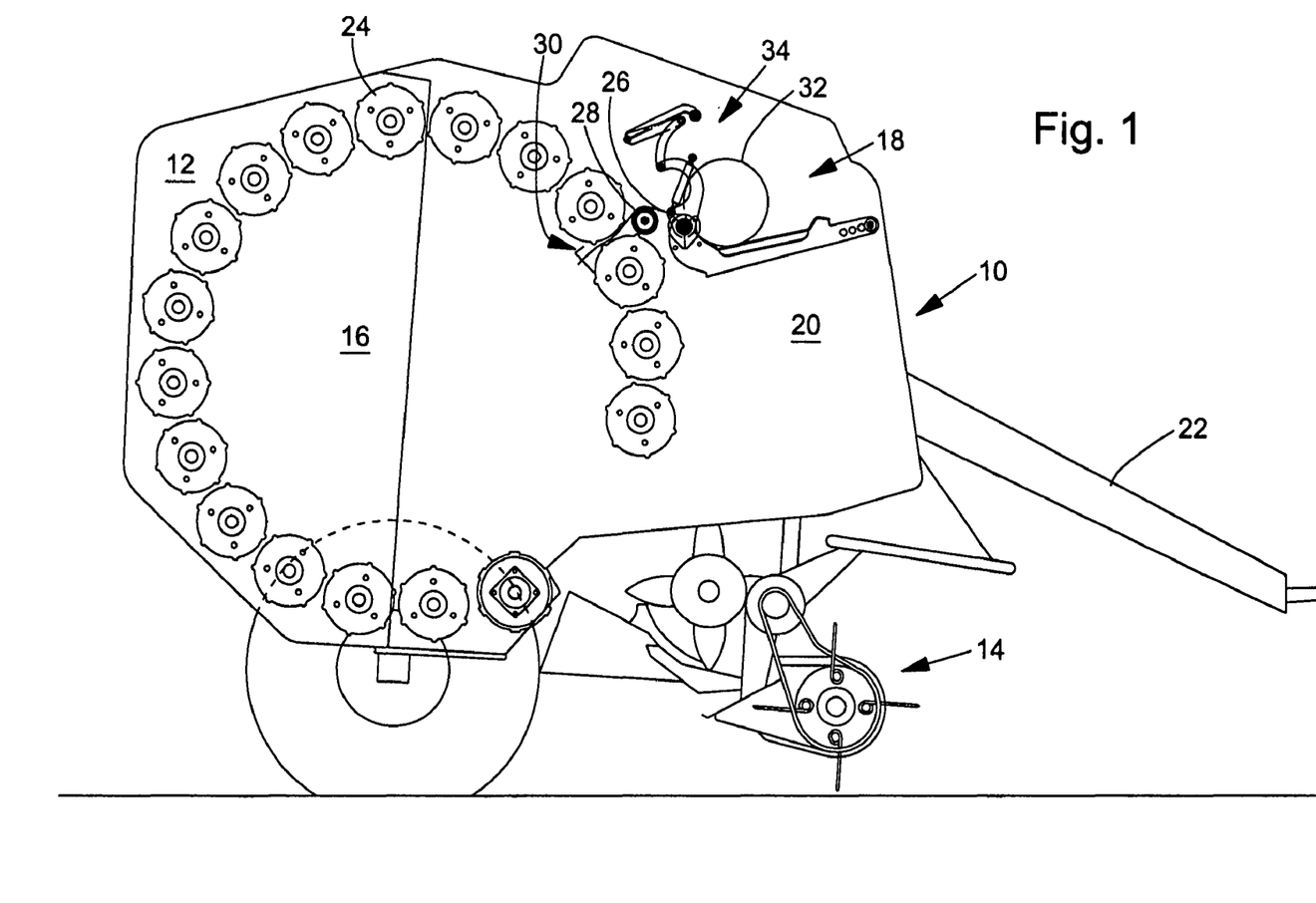
FIG. 1 illustrates a round baler provided with an wrapping mechanism embodying the present invention.

A round baler 10, with which the present invention may be employed, is shown in FIG. 1 and includes a carriage 12, a harvested product feeding mechanism 14, a pressing chamber 16 and a wrapping mechanism 18.

The round baler 10 described herein is merely representative of a press that supplies a pressed product that is to be covered with wrapping material. Consequently, the baler 10 could be either an agricultural or an industrial press, with which harvest products, garbage, paper, textiles, cotton, tobacco, etc. can be shaped into round-cylindrical bales. The shown structure of a fixed chamber press is also only illustrative and could alternatively be designed as a round baler 10 with a variable pressing chamber 16 or in a mixed structure. Basically, the wrapping mechanism 18 disclosed herein can be used wherever one has to cover an object with a wrapping material that is drawn off a roll, i.e. the wrapping mechanism may be provided independent of the availability of a press.

The carriage 12 includes a frame (not shown in detail) and an axle with wheels, to which side walls 20 and a tow bar 22 are fixed in a traditional manner. The tow bar 22 stretches almost horizontally from the front-end region of the carrier 12 and engages a tow vehicle, such as a tractor, that is not shown.

The harvested product feed device 14 represents the mechanism with which the materials that are to be pressed are fed into the pressing chamber 16. The harvest feed device 14 is situated under the tow bar 22.

The pressing chamber 16 extends between the side walls 20 and, in this case, is surrounded by a series of rollers 24 positioned generally in the form of a circle. the rollers 24, however, leave an upper clearance in the front region for the wrapping mechanism 18 and a lower clearance through which the harvested product feed device 14 introduces the material to be wrapped in to the chamber 16.

The wrapping mechanism 18 is used to introduce wrapping material 26, in the form of foil, net, paper or similar material, into the pressing chamber 16 and in order to wrap a pressed product. In general, such wrapping mechanisms are known and positioned at almost any desired point on the round baler 10. Ideally, the mechanisms are located in such a position that a person operating the mechanisms can have easy access to them. In the illustrated embodiment, the wrapping mechanism 18 is situated in the front region of the carriage 12, above the tow bar 22, and is constructed in such a way that it delivers the wrapping material 26 through a gap—the upper gap—between two rollers 24 into the pressing chamber 16. In the region of the gap, there is also provided a roller 28 for feeding the wrapping material 26 and a separating device 30 to cut the wrapping material 26, both of which may be of conventional construction. The wrapping material 26 is wound to form a wrapping material roll 32. The wrapping mechanism 18 is also provided with a loading device 34, the features and operation of which can be seen in the FIGS. 2 through 6.

Figure 2:
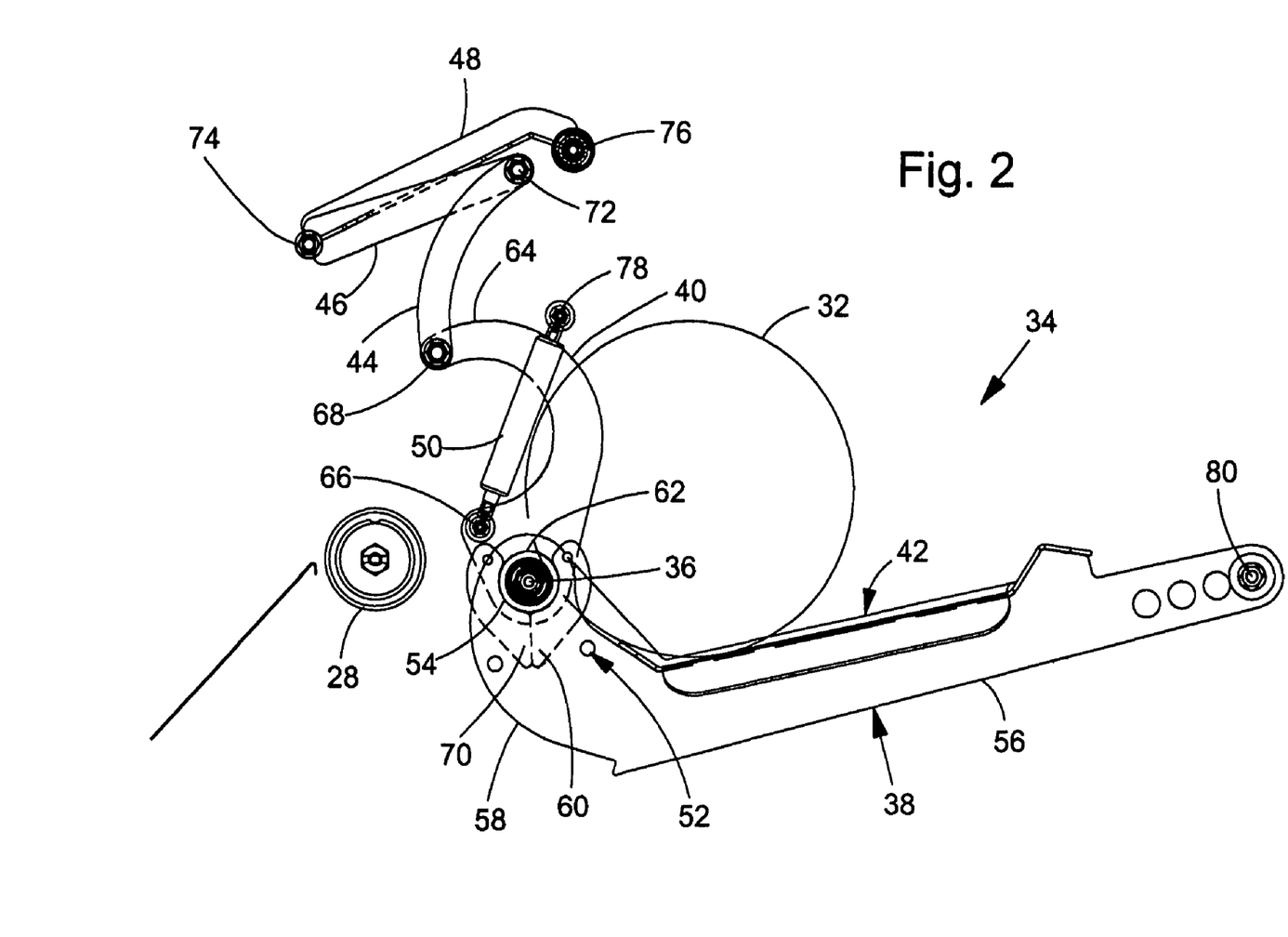
FIG. 2 illustrates the wrapping mechanism in a loading condition.
Figure 3:
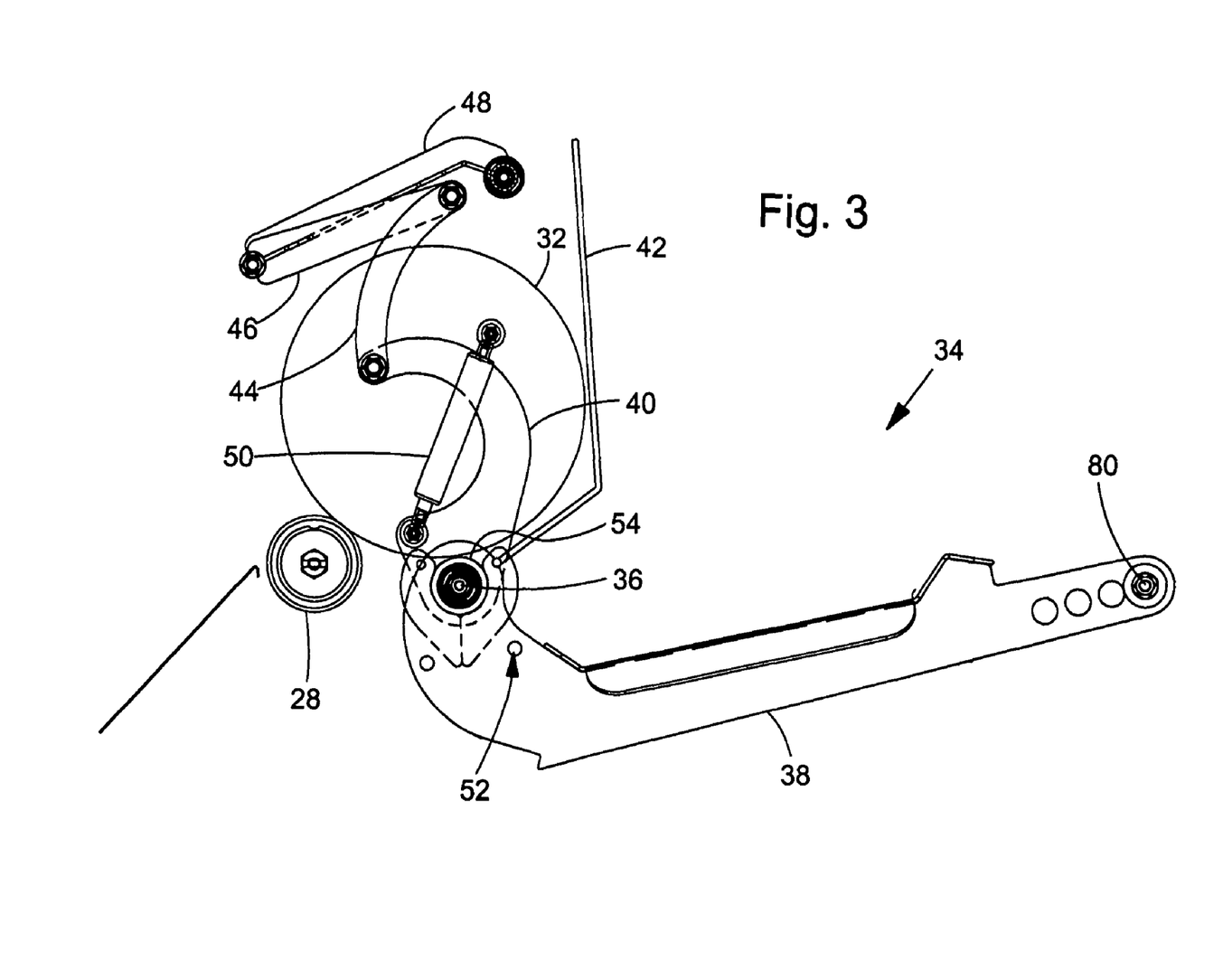
FIG. 3 illustrates the wrapping mechanism with an wrapping material roll in a loaded condition.
Figure 4:
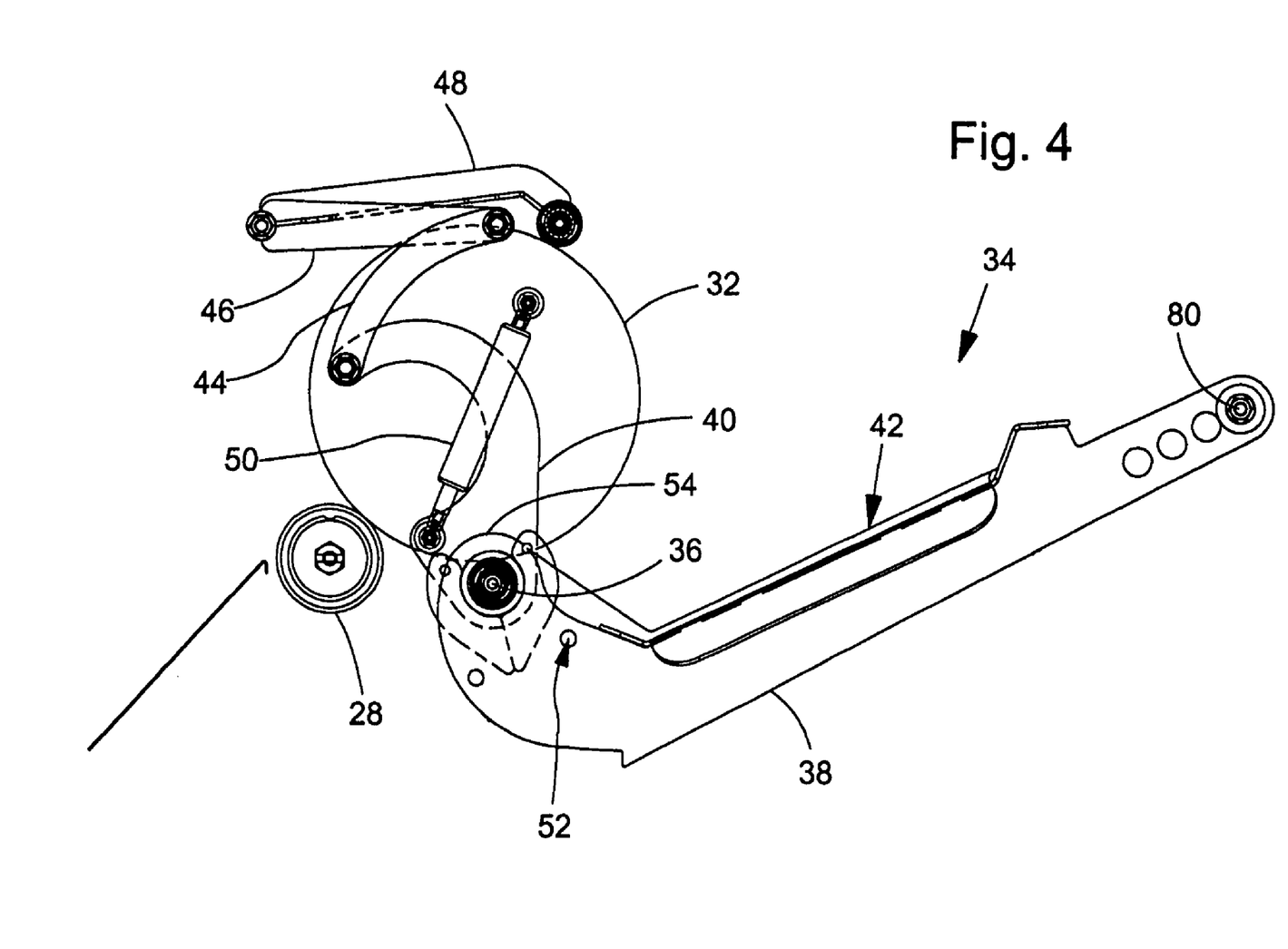
FIG. 4 illustrates the wrapping mechanism with the wrapping material roll in operable condition.
Figure 5:
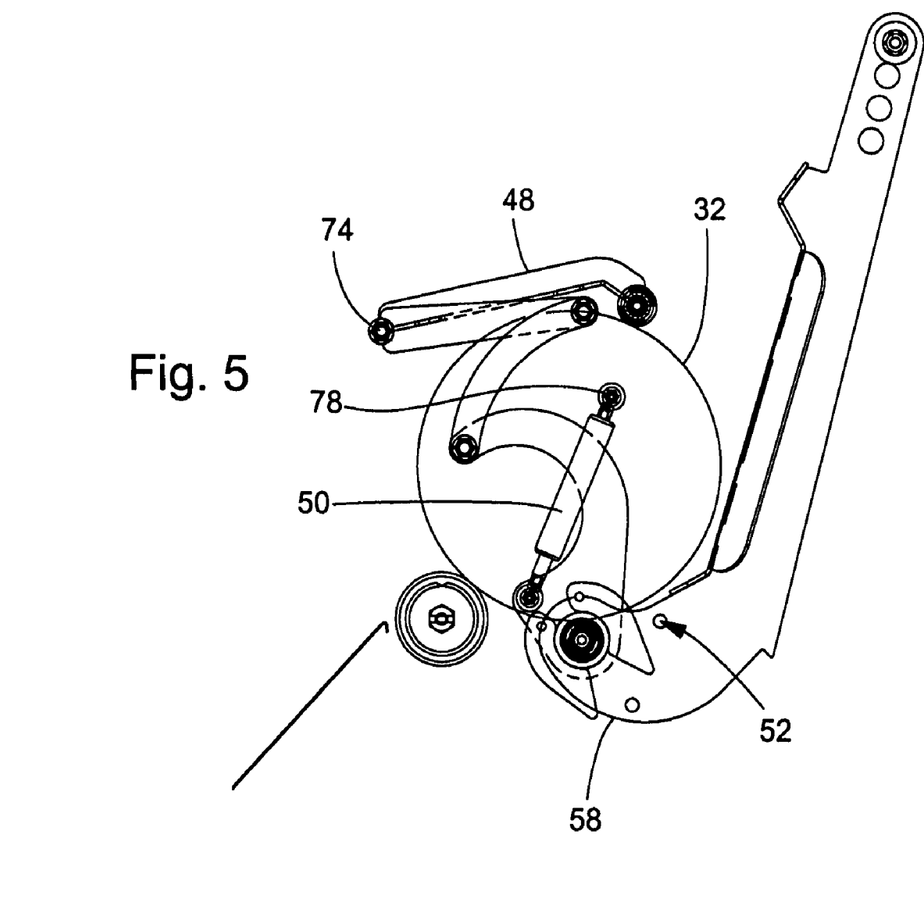
FIG. 5 illustrates the wrapping mechanism in operating position.

FIG. 2 shows the wrapping mechanism 18 and its loading device 34 in a loading condition, whereby the following components of the loading device 34 can be readily identified: a bearing 36, a carrier 38, an arm 40, an intermediate frame 42, a first steering rod 44, a second steering rod 46, a pressing arm 48, an activating device 50, a locking mechanism 52 and a support roller 54.

The loading device 34 is constructed and arranged in such a way that a wrapping material roll 32 can be comfortably placed by an operator on the carrier 38 or its intermediate frame 42, and, particularly with the help or with the support of the activating device 50, can be brought into an operating position.

The bearing 36 is formed by a continuous shaft, neck or something similar, which defines a horizontal swivel axis or rotation axis extending transverse to the drive direction of baler 10. The rotation axis thus extends parallel to, in front of and approximately at the height of the rotation axis of the roller 28.

The carrier 38 can be made of steel or plastic and is strong enough to carry around the wrapping material 32; generally it is designed as a welded assembly that stretches between the side walls 20 and can be swiveled vertically around the bearing 36. The carrier 38 is divided into a long carrying arm 56 and a short connecting arm 58, which are designed together as one piece and mainly run at right angles to one another. The lengths of the carrying arm 56 and the connecting arm 58 are selected in such a way that the wrapping material roll 32 can be covered in the loading position as well as in the operating position. In the loading position, the carrying arm 56 is inclined towards the connecting arm 58, so that a wrapping material roll 32 that has been placed on it cannot unintentionally roll off of it. On the connecting arm 58 there is a mechanical stop 60, which in the position shown in FIG. 2, offers an almost vertical stopping surface, running radial to the center point of the bearing 36. The connecting arm 58 is held on the bearing 36 with its free region as a pivot.

The arm 40 has a bent shape generally similar to the upper part of a question mark. The lower end of the arm 40 has a lower bearing 62, at the lower beginning of an arc 64 a central bearing 66, and at the upper end of the arc 64 an upper bearing 68. Finally, a mechanical stop 70 is provided, whose stop surface runs radially to the center point of the bearing 36. The arm 40 is designed as a flat element, e.g. mad of flat steel, and placed respectively on the inner or outer side of the sidewall 20. Each arm 40 is supported vertically and pivots with its lower bearing 62 on the bearing 36. The arm 40 can be pivoted to such an extent that the inner side of the arc 64 takes up or receives the roller 28. The central bearing 66 serves the purpose of connecting the lower end region of the activating device 50, and the upper bearing 68 serves the purpose of connecting to the first steering rod 44. All bearings 62, 66, 68 lie almost on a line and are designed in a relatively simple manner, e.g. with pivot pins or screw/bolts in a hole. The mechanical stop 70 is fixed on the arm 40 or designed in such a way that, at the position shown in FIG. 2, it provides an almost vertical stop surface, which is engaged with a similarly disposed stop surface it on the mechanical stop 60 carried by the connecting arm 58 of the carrier 38.

The intermediate frame 42 is designed as a bent plate or something similar, which lengthwise lies on the carrier 38, and is held on and pivotal about the bearing 36. While not shown, the intermediate frame 42 can be provided with one or more handles that make it easier to swing the intermediate frame 42 upwards, along with the wrapping material roll 32 lying on it. The intermediate frame 42 is not absolutely necessary, but it allows the wrapping material roll 32 to be brought into an operating position without the carrier 38.

For inserting or mounting the wrapping material roll 32 into its operating position, one can use the activating device 50 or any other separate device.

The first steering rod 44 is designed as a slightly bent flat iron, which connects, on the one end, to the bearing 68 of the arm 40 and, on the other end to a bearing 72 in an end region of the second steering rod 46 as a pivot joint. The steering rods 44 and 46 are provided on each side of the assembly.

The second steering rod 46 is connected in a fixed manner to the pressing arm 48 and runs towards it at an acute angle of approximately 15°. The second steering rod 46 is connected on one end with the first steering rod 44 in the bearing 72. On the other end, the second steering rod 46 is supported in a vertically pivoted manner on a bearing 74, whereby the bearing 74 defines a pivot axis that runs parallel to the pivot axis of the bearing 36, but is located significantly higher and behind it. The bearing 74 is arranged in a fixed manner on to the sidewall or something similar.

The pressing arm is provided so as to be slightly longer than the second steering rod 46 and is formed on its end region away from the bearing 74 with an angle, on which a roller 76 is supported, preferably in a rotatable manner. The roller 76 runs parallel to the roller 28 and is arranged is such a way that it can be placed on and engage the peripheral surface of the wrapping material roll 32.

The activating device 50, in the illustrated embodiment, is a gas pressure spring. Alternatively, a mechanical spring (such as a helical compression spring) or even a motor (such as a hydraulic or electrical motor) could be utilized. The activating device 50 is held with its upper end region at a fixed location in a bearing 78 on the carriage 12 or a side wall 20. The activating device 50 at its lower end region is connected to the central bearing 66. In its operating condition it stretches almost vertically, whereby the central bearing is always situated to the side of a straight line through the bearing 78 and the lower bearing 36. The arrangement of the activating device 50 is provided in such a way that it constantly biases the carrier 38 upwards out of the position shown in FIG. 2 and to the position shown in FIG. 5.

The locking mechanism 52 is additionally formed by an axially movable pin (not shown) that can be secured at its end, which is held in the sidewall 20 and can be pushed into a hole in the connecting arm 58 or can be pulled out of it. If the pin extends into the hole, then the carrier 38 is secured in the position shown in FIG. 2, and the activating device 50 cannot be employed.

The support roller 54 is designed in the form of a pipe made of steel or plastic and extends co-axial to the axis of the bearing 36. The support roller 54 can be held in a rotatable manner on the bearing 36 and, along with the roller 28, is suited for supporting the wrapping material roll 32. The support roller 54 can be designed in a driven, braked or freely rotating manner.

From the description presented above, it is seen that a pivotal movement of the arm 40 around the bearing 36, on account of the first steering rod 44, simultaneously effects a pivotal movement of the second steering rod 46 and the pressing arm 48 around the bearing 74, which results in the roller 76 being lowered onto the wrapping material roll 32 or being lifted up from it. This pivotal movement of the arm 40 is executed in the direction of the wrapping material roll 32 by the activating device 50, as soon as the carrier 38 is pivoted around the bearing 36, as shown in the drawing, in a counterclockwise direction. As a result, the abutting surfaces of the mechanical stops 60 and 70 are separated from one another.

If the roller 76 is lifted up from the wrapping material roll 32, e.g. in order to insert/mount a new wrapping material roll 32, then the carrier 38 is swiveled downwards in a clockwise direction around the bearing 36. This causes the mechanical stop 60 to come to rest against the other mechanical stop 70. For this purpose, a rod or handle 80 is provided on the carrier 38, on the free end of the carrying arm 56 that allows an operator to safely grip the carrier 38. If the carrier 38 is moved further, then with the help of the mechanical stop 60 it causes the arm 40 to pivot around the baring 36 and thereby tensions the activating device 50. At the same time, the arm 40 presses the second steering rod 46, through the first steering rod 44 and the pressing arm 48, in a counterclockwise direction around the baring 74 and lifts the roller 76 from the wrapping material roll 32. It is apparent that this movement of the carrier 38 against the bias of the activating device 50 can be easily and comfortably executed by an operator.

In the lowered position of the carrier 38, a new wrapping material roll 32 can be placed on it, which can be moved onto the roller 28 and the support roller 54 with the help of the intermediate frame 42. The carrier 38 is held in its lowered position with the help of the locking mechanism 52, until it is brought into its non-secured position. Finally, by swinging the carrier upwards, the roller 76 is lowered and the wrapping material roll 32 is secured in its position.

Figure 6:
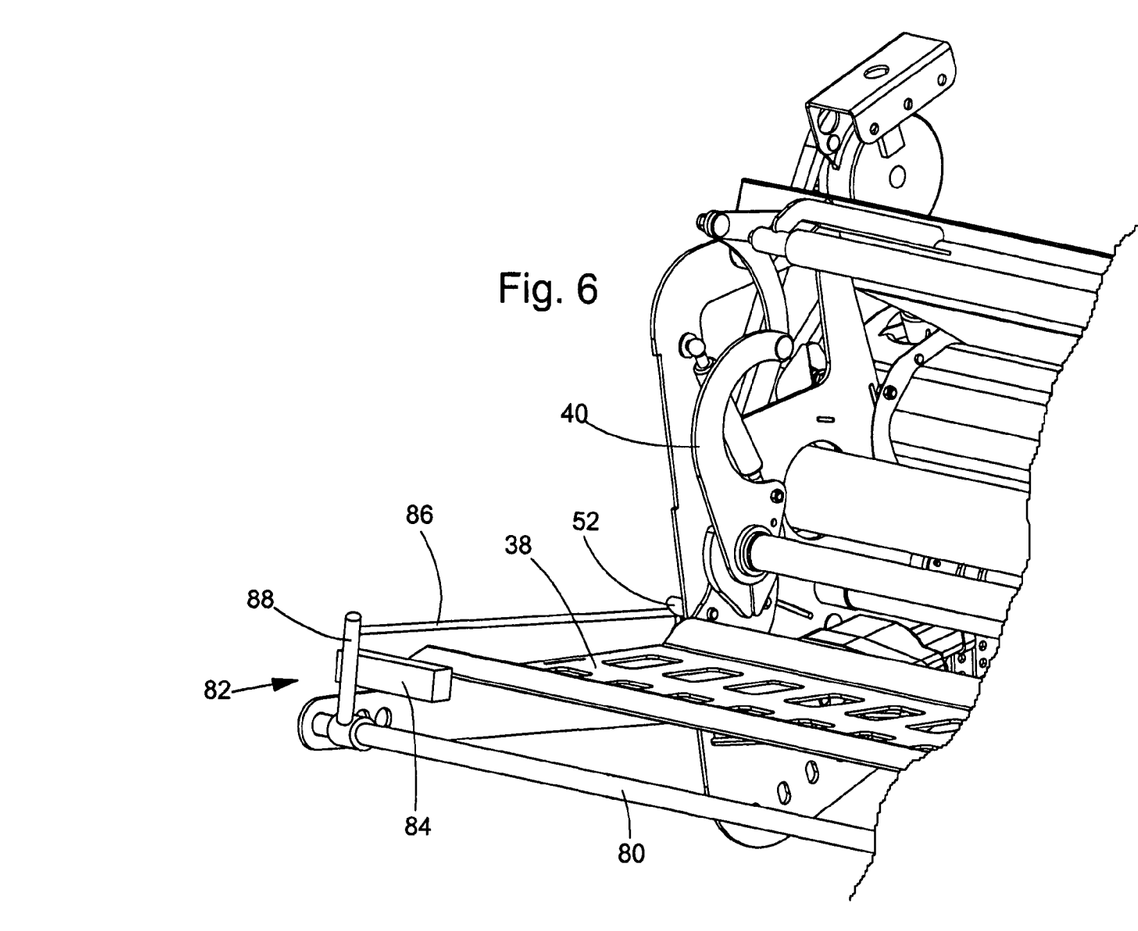
FIG. 6 illustrates a locking mechanism activating device.

FIG. 6 shows a further embodiment of the locking mechanism 52, it being of a type, which at the free end of the carrying arm 56, includes a lock activating device 82 with a handle 84 and a rod 86. The locking activating device 82 serves the purpose of deactivating the locking mechanism 52 when the carrier 38 is supposed to be swiveled upwards. The handle 84 is supported in this case on the rod 80, can be swiveled around it and can be gripped along with the rod 80, which allows unlocking and subsequent swiveling up of the carrier 38. The handle 84 is provided with an arm 88 running radial to the rod 80, against whose free end region the rod 86 attaches in a movable manner. The rod 86 itself can take tension and compression loads and is designed as a simple rod, which on the one end is connected to the handle 84 and on the other end to the locking mechanism 52. The locking mechanism is designed in this embodiment in such a way, that rotational movement of it gets converted into an axial movement, which either creates or interrupts the connection between the carrier 38 and the side wall 20 of the carriage 12. It is also possible to use the locking mechanism 52, and if required the locking activating device 82, not only in the lowered position of the carrier 38, but also to effect a locking of the carrier 38 in its raised or upper position.

Obviously, the illustrated locking mechanism 52 and locking mechanism activating device 82 are only representative and other types of locking mechanism and locking mechanism activating devices may be utilized. Thus, a locking mechanism can be activated by mechanical means, with the help of a spring, electrical current, pressure oil or compressed air. Similarly, the locking mechanism activating device can also be designed as a ratchet or something similar, which can be activated, when the carrier 38 moves beyond its end position and thus activates the locking mechanism.

The invention claimed is:

1. A round baler wrapping mechanism for use with a wrapping material roll containing a wrapping material, comprising:
    a wrapping material feed roller;
    a wrapping material roll loading device including:
        an elongate carrier for supporting the wrapping material roll, the carrier being pivotally mounted for swinging vertically about a horizontal axis extending parallel to and being located in adjacent spaced relationship to, and at a level approximating a level of, said feed roller for movement between a loading position, wherein said carrier is substantially horizontal for receiving a roll of wrapping material to be loaded, and an operating position, wherein said carrier is substantially vertical for ejecting the roll of wrapping material into engagement with said feed roller, whereby wrapping material can be removed from the wrapping material roll by said feed roller;
    said carrier including a first stop having a first stop surface disposed adjacent to said axis;
    an arm mounted for pivoting vertically about said axis and including a second stop having a second stop surface engaged with said first stop surface when said carrier is in said loading position;
    an activating device coupled directly to said arm and being configured to resiliently bias said second stop surface into engagement with said first stop surface so as to assist movement of said carrier from said loading position toward said operating position.

2. The loading device of claim 1 and further including a support roller mounted for rotating about said axis and being so located relative to said feed roller that it cooperates with the feed roller for supporting said roll of wrapping material.

3. The loading device of claim 1 and further including a pressing arm pivotally mounted for swinging vertically about a second horizontal axis spaced vertically above, and extending parallel to, said feed roller, with said pressing arm having an end disposed for engaging the roll of wrapping material when the roll of wrapping material is supported by the feed roller and support roller; and
    a steering rod arrangement being linked between said pressing arm and said arm such that said activating device serves to resiliently bias said end of said pressing arm into engagement with said roll of wrapping material when the latter is supported by said feed roller and support roller and when said carrier is in said operating position.

4. The loading device of claim 1 wherein the activating device is a spring.

5. The loading device of claim 4 wherein the activating device is a gas spring.

6. The loading device of claim 1 wherein the carrier includes an arm arrangement and an intermediate frame, the intermediate frame being mounted in overlying relationship to said arm arrangement for movement relative to said arm arrangement between a substantially horizontal position for having said wrapping material roll placed thereon, and a substantially vertical position ejecting said wrapping material roll into engagement with said feed roller; and said intermediate frame being manually moveable between said substantially horizontal and vertical positions.

7. The loading device of claim 1 wherein said carrier includes an arm arrangement defined by a long carrying arm joined to a short connecting arm; said long carrying arm, as considered when said carrier is in said loading position, inclines downwardly toward said short connecting arm, with the short connecting arm being inclined upwardly from said carrying arm and having an end mounted at said axis, thereby establishing the mounting by which said carrier is movable between said loading and operating positions.

8. The loading device of claim 1 wherein the wrapping mechanism includes a pressing arm, exclusive of said carrier, carrying a pressing roller at a free end thereof, with said pressing arm being mounted for movement so as to bring said pressing roller to and from engagement with said wrapping material roll when said wrapping material roll is engaged with said feed roller; and a steering rod arrangement being coupled between said arm and said pressing arm such that said roller is loaded directly against said wrapping material roll by the activating device when said carrier is in said operating position.

9. The loading device of claim 1 and further including a locking mechanism including a locking element coupled to said carrier for selectively securing said carrier in at least one of said loading and operating positions thereby isolating said carrier from being influenced by said activating device.

10. The loading device of claim 9 wherein the locking mechanism further includes a second activating device coupled to said locking element and being selectively operable for activating and deactivating the locking element.

* * * * *